(12) United States Patent
Baas et al.

(10) Patent No.: US 7,303,777 B2
(45) Date of Patent: Dec. 4, 2007

(54) METHOD FOR CONTINUOUSLY MAKING KETTLE STYLE POTATO CHIPS

(75) Inventors: Ian Andries Baas, Sunnybank (AU); David Lawrence Barry, Highland Village, TX (US); Graeme Russell Beasley, Bunya (AU); Jeffrey Weldon Olds, Nevada, TX (US); Neil David Rossiter, Turramurra (AU); Ross Douglas Samuels, Coppell, TX (US); Michael Rajendra Kalika Singh, Asquith (AU)

(73) Assignee: Frito-Lay North America, Inc., Plano, TX (US)

( * ) Notice: Subject to any disclaimer, the term of this patent is extended or adjusted under 35 U.S.C. 154(b) by 392 days.

(21) Appl. No.: 10/895,163

(22) Filed: Jul. 20, 2004

(65) Prior Publication Data

US 2006/0019007 A1    Jan. 26, 2006

(51) Int. Cl.
*A23L 1/217* (2006.01)
(52) U.S. Cl. .................. 426/428; 426/519; 426/808
(58) Field of Classification Search ............... 426/438, 426/519, 808, 637, 441; 99/409
See application file for complete search history.

(56) References Cited

U.S. PATENT DOCUMENTS

| | | | |
|---|---|---|---|
| 4,741,912 A | 5/1988 | Katz et al. | |
| 4,844,930 A | 7/1989 | Mottur et al. | |
| 4,863,750 A | 9/1989 | Pawlak et al. | |
| 4,867,049 A | 9/1989 | Johnson | |
| 4,923,705 A | 5/1990 | Mottur et al. | |
| 4,929,461 A | 5/1990 | Schonauer et al. | |
| 4,956,189 A | 9/1990 | Johnson | |
| 4,977,821 A | 12/1990 | Benson et al. | |
| 4,980,187 A | 12/1990 | Johnson | |
| 5,085,137 A | 2/1992 | Mottur et al. | |
| 5,112,633 A | 5/1992 | Benson et al. | |
| 5,137,740 A | 8/1992 | Benson et al. | |
| 5,167,979 A | 12/1992 | Benson et al. | |
| 5,580,598 A | 12/1996 | Benson et al. | |
| 5,643,626 A | 7/1997 | Benson et al. | |

FOREIGN PATENT DOCUMENTS

| | | |
|---|---|---|
| GB | 2170396 | 6/1986 |
| GB | 2251366 | 8/1992 |

*Primary Examiner*—Keith Hendricks
*Assistant Examiner*—Vera Stulii
(74) *Attorney, Agent, or Firm*—Colin P Cahoon; Chad E Walter; Carstens & Cahoon, LLP

(57) ABSTRACT

A continuous cooking process is disclosed that mimics the U-shaped temperature-time profile produced by a batch kettle fried potato chip operation. Potato slices are placed into hot oil in a flume portion of a continuous fryer. The potato slices exit the flume into an upstream portion of the fryer. Cooling oil is injected to the upstream portion of the continuous fryer to continuously achieve the trough portion of the U-shaped temperature-time profile. The potato slices are then further fried in the downstream portion of the fryer in a region having an increased hot oil temperature. The increased hot oil temperature occurs by injecting hot oil into the downstream portion. The temperature of injected hot oil can be controlled by the exit moisture content of the potato slices.

27 Claims, 2 Drawing Sheets

METHOD FOR CONTINUOUSLY MAKING KETTLE STYLE POTATO CHIPS

BACKGROUND OF THE INVENTION

1. Technical Field

The present invention relates to an improved method for the production of potato chips and more particularly to a method for continuously making kettle style potato chips which are similar in taste and texture to those kettle style potato chips produced by a traditional batch process.

2. Description of Related Art

Commercial production of potato chips typically involves a continuous process wherein sliced potatoes are continuously introduced into a vat of frying oil at a temperature of about 365° F. (about 185° C.) or higher, conveyed through the oil by paddles or other means, and removed from the oil after about two and one-half to three minutes of frying by an endless conveyor belt when the moisture content of the chips has been reduced to about 2% by weight or less. The resulting product generally has texture and flavor characteristics which are usually recognizable by consumers as typical commercially produced continuous process potato chips.

Potato chips produced by batch processes in kettle fryers have texture and flavor characteristics which are usually recognized by consumers as being distinctly different from typical commercially produced continuous process potato chips. As the name implies, batch process kettle frying of potato chips involves placing a batch of potato slices in a kettle of hot oil, e.g., at a temperature of about 300° F. (about 150° C.). In the conventional kettle fryers used in the production of kettle-style chips, the cooking oil temperature follows a generally U-shaped time vs. temperature profile as illustrated in FIG. 5 of U.S. Pat. No. 5,643,626, assigned to the same assignee as the present invention, which is hereby incorporated by reference. Upon introduction of the potato slices into the oil, the temperature of the oil typically drops quite rapidly by as much as 50° F. (about 28° C.) or more. As depicted by the Figure, the oil temperature falls to a low point temperature of about 235° F. to about 240° F. for a low point time of about 4 minutes. Heat to the kettle is then quickly increased and then the temperature of the oil begins to gradually rise, reaching about the initial frying temperature of about 300° F. The resultant potato chip has a moisture content of between 1.5% to 1.8% by weight.

Batch fried chips are generally harder and more crunchy than continuously fried chips and have a flavor that some consumers find more appealing than typical continuously fried commercial chips. It is believed in the art that the U-shaped temperature-time profile imparts the intense flavor and unique mouth feel characteristic of kettle-style chips. The commercially available kettle fryers, however, are relatively unsophisticated equipment that are significantly constrained by burner capacity and heat transfer capacity. Thus, the observed U-shaped temperature-time profile is unavoidable with the conventional kettle equipment, as the system cannot supply heat quickly enough to overcome the large heat sink created by the addition of a batch of raw potato slices. Changes in oil volume, initial fry temperature or potato batch weight will cause changes in temperature profile and finished product attributes. Therefore, the production of potato chips having the desired kettle-style attributes requires the adjustment of the process parameters in a manner that results in the U-shaped temperature-time profile.

Production rates using batch kettle fryers are dependent upon the equipment used. The modern kettles that are utilized in batch processes are generally manufactured of stainless steel, and vary in size and capacity. The kettles typically are heated by gas burners positioned directly under the kettle floor. Fryer capacities range from as few as 60 pounds per hour to up to 500 pounds per hour (finished product basis), although most batch fry operations have kettle fryers that can manufacture between 125 and 200 pounds of chips per hour. In order to efficiently use a batch kettle fryer of a given size, it is necessary to maintain a particular "load" or amount of potato slices per volume of oil, in order to produce the desired U-shaped temperature-time profile. These and other constraints provide limits on the amount of throughput using batch kettle fryers. By contrast, potato chips made by a continuous process can employ continuous fryers capable of producing 1,000 to 5,000 pounds per hour of finished product. The kettle or batch process is therefore less economical than a continuous process.

Consequently, there is a need in the art for an efficient continuous process for the production of potato chips having batch-fried texture and flavor characteristics. Specifically, there is a need for increasing the production rate and production efficiency of fried kettle-style potato chips without diminishing the desired hard bite texture and flavor.

Several attempts have been made in the prior art at solving this problem. Such attempts are illustrated by U.S. Pat. Nos. 4,741,912, 4,929,461, 4,863,750, and 4,956,189. However, these solutions all fail to produce a continuous process having a U-shaped temperature-time profile.

Another prior art solution to this problem is illustrated by U.S. Pat. No. 4,923,705, assigned to Borden, which discloses a continuous method for making kettle style potato chips. FIG. 1 is a schematic representation of the invention disclosed in the Borden patent. The drawing shows various features of the apparatus including, a slicer 1; an oil flume 3 outfitted with agitating means 5 having an adjustable flap 10 situated at the flume outlet; an elongated fryer vessel 4 having a plurality of oil entry ports and equipped with longitudinal paddle assemblies 15; a submerging conveyor 17; an optional oil spray 18; a take-out conveyor 19; an oil pump 20; and a heat exchanger 21 for heating oil external to the apparatus.

The apparatus has a first oil inlet port 2 situated at the infeed end of the flume; the second oil inlet port 7 near the entrance end of the fryer; and the third oil inlet port 11 two-thirds of the way down the length of the fryer. Also disclosed is a fourth oil inlet port 9, situated between the second and third oil inlet ports. The purpose of these multiple oil inlet ports is to provide a specific temperature profile throughout the fryer. Unfortunately, this configuration fails to produce a desirable temperature profile or an easily controlled temperature profile. Like many of the prior art solutions, this configuration uses product load to drop the oil temperature and then adds hot oil to the fryer to increase the temperature. Thus, it is especially difficult to mimic the trough section of the U-shaped temperature-time profile. For example, the Borden patent teaches admitting oil by way of the second oil inlet 7 with either re-heated oil (having a temperature of 300° F. to about 320° F.), non-reheated oil (having a temperature of 285° F. to about 300° F.), or mixtures of re-heated and non-reheated oil. Thus, the temperature of oil entering the second oil inlet 7 at the beginning of the second zone necessarily ranges from 285° F. to 320° F. Further, oil from the flume is entering the second zone at a temperature of about 250° F. to about 275° F.

Given these oil inlet temperatures, one can see the difficulty in achieving an oil temperature in the second zone of about 240° F. to about 265° F. as called for by the Borden patent. This process is very dependent upon product load to achieve the desired low temperature drop for the desired time. In addition, the entire volume of oil from the flume and the second inlet 7 must then be heated in the third zone to a temperature of between about 285° F. and 310° F., a difficult scenario given the available driving force. For example, the heating means for heating the large amount of oil in the fryer is limited to hot oil having a temperature of only 300° F. to about 320° F., just a few degrees above the third zone target temperature. Thus, the disclosed configuration fails to provide an easily controllable temperature profile within a continuous fryer.

Similarly, U.S. Pat. No. 5,137,740, assigned to Heat and Control, discloses a multi-temperature zone fryer that mixes hot oil at a temperature of 300° F. to about 310° F. with the fryer oil to change the rate of temperature drop within a second zone. Again, attempting to mimic the trough section of the U-shape temperature-time profile with the use of product load and injected hot oil at over 300° F. has proven difficult.

Consequently, a need exists for improvements in the continuous production of kettle-fried potato chips. The improved method should mimic the temperature-time profile of a potato chip made from the traditional batch process. Further, the improved method should provide a way to better control the low point temperature for the desired amount of time. Moreover, the improved method should provide a way to better control the temperature rise that occurs subsequent to achieving the desired low point temperature for the desired amount of time.

SUMMARY OF THE INVENTION

The proposed invention provides a method for continuously making kettle style potato chips that simulates a hard-bite kettle-style potato chip similar to that produced in a traditional batch process. The instant invention, by using cooling oil, provides a method that better achieves the trough section of the U-shaped temperature-time profile of potato chips cooked in the traditional batch process. In one embodiment, potato slices are placed in an upstream end of a flume having hot cooking oil provided at a temperature of about 300° F. to about 320° F. In one embodiment, the potato slices are next routed to an upstream portion of a fryer where the potato slices achieve a low point temperature of about 230° F. to about 260° F. for a low temperature residence time of between about 3 minutes to about 4 minutes. The low point temperature and low temperature residence time is achieved, in part, by using cooling oil injected into the upstream portion of the fryer. The potato slices are then further cooked in the remaining portion of the fryer where the temperature of the hot oil in the fryer increases as the potato slices move further downstream. Hence, the present invention provides a more economical apparatus and method for continuously making kettle-style potato chips by a continuous method having desirable hard-bite texture and taste properties.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
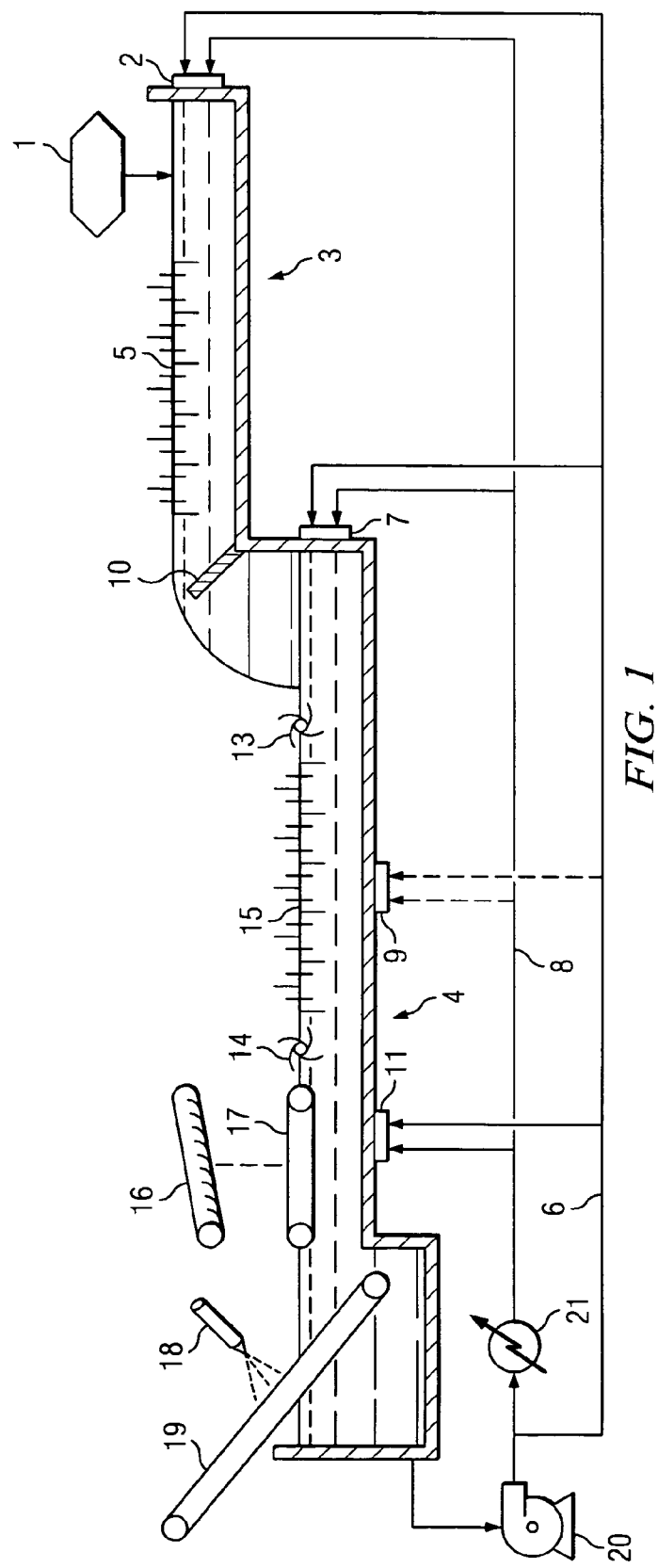
FIG. 1 is a schematic representation of a prior art apparatus used for making kettle style potato chips.
Figure 2:
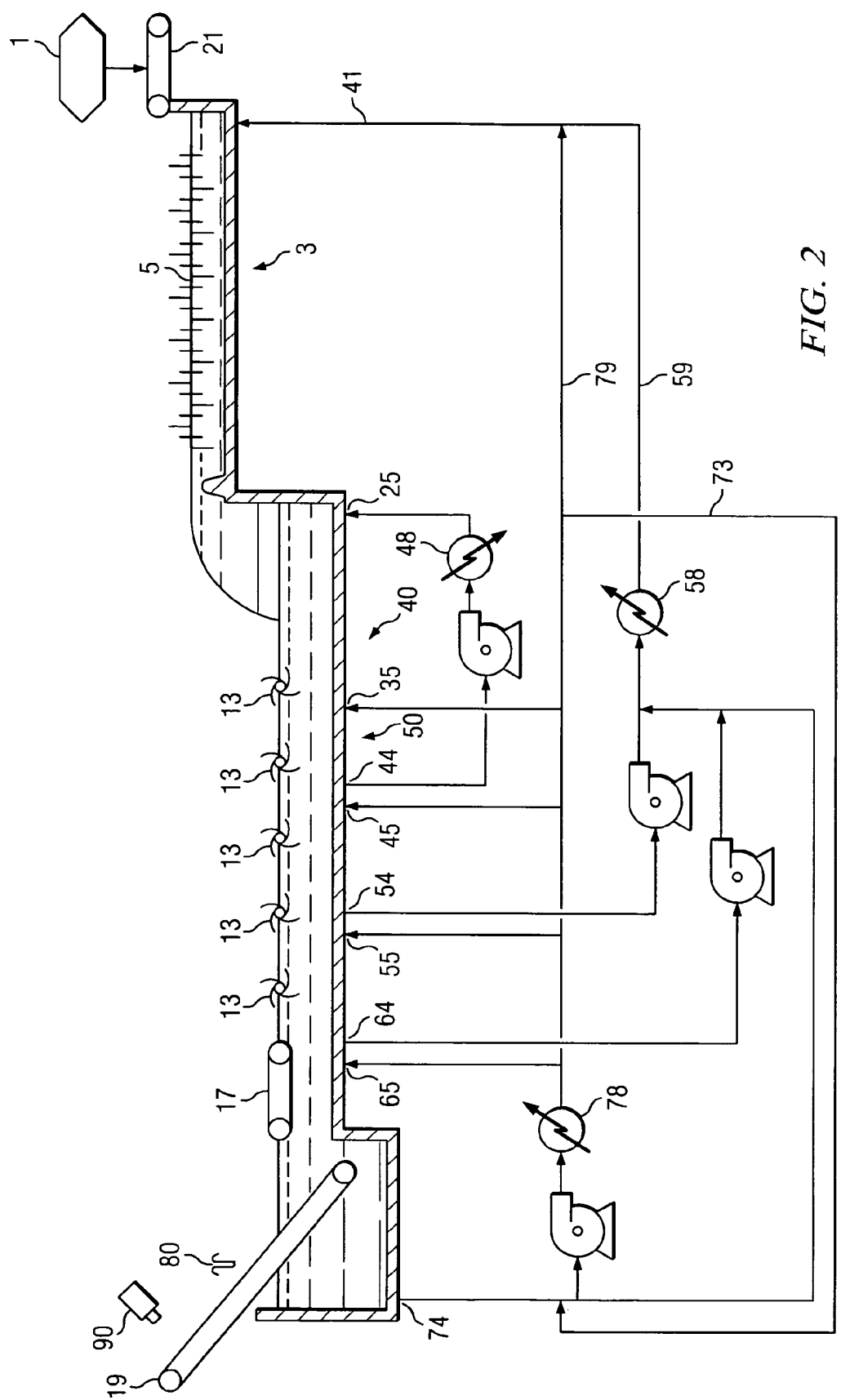
FIG. 2 is a schematic representation of the apparatus used for making kettle style potato chips in one embodiment of the present invention.

An embodiment of the innovative invention will now be described with reference to FIG. 2. FIG. 2 is a schematic representation of the apparatus used for making kettle style potato chips in one embodiment of the present invention. The same reference numerals are used to identify the same corresponding elements throughout all drawings unless otherwise noted. The apparatus includes a slicer 1 for slicing peeled potatoes to a thickness of between 0.058 inches to about 0.064 inches using, for example, an Urschel variable thickness slicer 1. The slices are preferably not washed or rinsed prior to entering to hot oil in the flume 3. The unwashed potato slices are dropped onto a belt 21, such as a high speed flatwire belt 21, to achieve a monolayer and then fed into the upstream end of the oil flume 3 in a substantially monolayer arrangement to prevent sticking of the potato slices. The slicing onto a high speed belt 21 such that singulated and monolayer slices are presented to the flume ensures minimal clustering and uniform exposure of all slices to the hot oil, thus minimizing potential for soft center formation. Heating oil enters the upstream portion of the flume 3 at the first oil inlet 41 at a flume oil temperature of between about 300° F. and about 320° F. (148° C.-160° C.). As used herein, heating oil is defined as cooking oil having a temperature above about 300° F. The potato slice is in the flume for a residence time of about 15 to about 20 seconds and serves to set the surface starch to prevent product from sticking together in the fryer. In one embodiment, the flume 3 is agitated to ensure slice separation.

As the potato slices proceed downstream through the flume 3, oscillating finger paddles (paddles that travel back and forth much like a clock pendulum), rotating finger paddles, drum paddles, dunkers, and/or rotating paddle wheels 13 can be used to continuously convey the slices through the flume 3 and the main fryer and to control the level of clusters (defined as three or more potato chips sticking together) and impart the non-uniform appearance typical of a batch kettle chip. These finger paddles are adjustable for speed and duration of forward and backward movement.

The potato slices then enter the upstream portion of the main fryer 40. As used herein, the upstream portion of the main fryer 40 is defined as the general area between the second inlet 25 and the third inlet 35. Due to the decreased volume of the flume 3 and the fast flash-off of surface water from the potato slices, the oil temperature rapidly drops to a low point temperature in the upstream portion of the main fryer 40. A critical factor in producing the hard-bite kettle-style potato chip is the low point temperature and the low temperature residence time. As used herein, low temperature residence time is defined as the approximate amount of time it takes a potato slice to travel from the flume 3 entrance to the approximate location in the fryer where the fryer oil temperature begins to increase (e.g. where the trough of the U-shaped temperature-time profile ends.) As used herein, the low point temperature is defined as the temperature range that is within about 20° F. of the lowest oil temperature measured in the upstream portion of the fryer (e.g. substantially the trough section of the U-shaped temperature-time profile). It has been surprisingly found that the low point temperature and low temperature residence time can be better controlled by routing or injecting cooling oil into the upstream portion of the main fryer. As used herein, cooling oil is defined as a cooking oil having a temperature of less than about 250° F. (121° C.). Cooling oil can come from a number of sources including, but not limited to, fresh oil at ambient temperatures, or oil exiting the hot oil cooler 48.

In one embodiment, hot oil from a first outlet 44 is pumped and cooled in a hot oil cooler 48 to a temperature of about 230° F. (110° C.) before being routed to a second inlet 25 in the upstream portion of the fryer 40. The above temperature range is by illustration and not limitation. The optimal temperature or temperature range of hot oil exiting the hot oil cooler 48 and entering the second inlet 25 can be determined based upon product flow (e.g. pounds per hour of potato slices in the fryer), oil flow in the fryer and the flume 3, and first oil inlet 41 oil temperature used in the flume 3. Use of a hot oil cooler 48 enables the potato slices to achieve a low point temperature of between about 230° F. (110° C.) to about 260° F. (127° C.) and more preferably 250° F. (121° C.) to about 255° F. (124° C.) for a low temperature residence time of between about 3 to about 4 minutes. The hot oil cooler 48 can use cooling water or any other desirable fluid as the cooling medium. The cooling oil from the hot oil cooler 48 can ensure that the desired low point temperature is reached for the desired low temperature residence time before heating oil is added to elevate the temperature in the main fryer to further dehydrate the potato slices.

Once the potato slices have reached the desired low point temperature for the desired low temperature residence time, the oil in the remaining portion of the fryer 50 is re-heated to mimic the temperature-time profile of a batch process. Thus, the temperature in the remaining portion 50 of the fryer increases as the potato slices move downstream. As used herein, the remaining portion of the fryer 50 is defined as the area generally downstream of the third inlet 35, or location where heating oil is first injected after cooling oil is injected. This re-heating can be efficiently achieved by draining the cooler fryer oil through a plurality of oil outlets 44 54 64 while also adding heated hot oil to the fryer through a plurality of inlets 35 45 55 65. In one embodiment, oil inlets are placed downstream of oil outlets to avoid draining recently added hot oil. Removal of cooler oil lessens the total oil volume that is re-heated. Depending upon the need, heating oil can enter the third inlet 35 at the temperature range desired to obtain the desired temperature-time profile. The temperature of the cooking oil at the first inlet 41, second inlet 25, third inlet 35, fourth inlet 45, fifth inlet 55, and sixth inlet 65 can be controlled in a number of ways recognizable to those skilled in the art. For example, the inlet temperatures can be varied by manipulating the outlet temperatures of the heat exchangers, including the main heat exchanger 78, the trim heat exchanger 58, and the cooling heat exchanger 48. In one embodiment, the main heat exchanger 78 and trim heat exchanger 58 use steam as a heating medium. In one embodiment, the main heat exchanger 78 has an exit oil temperature of between about 350° F. and about 400° F. Such a temperature can increase the driving force to better enable the reheating of the oil in the fryer subsequent to the low point temperature. In one embodiment, a trim heat exchanger 58 is not used. The inlet oil temperatures can also be controlled by mixing cooling oil including, but not limited to, fresh oil at ambient temperatures, oil exiting the hot oil cooler 48, or from a by-pass line that by-passes the heat exchangers 58 78, with the heated oil exiting the heat exchangers 58 78. As used herein, fresh oil at ambient temperatures is defined as cooking oil from a source other than the flume or fryer.

Once the potato slices have reached the desired low point temperature for the desired low temperature residence time, the potato slices are dehydrated to a potato slice exit moisture content of below 2%, and more preferably below about 1.5% by weight. As used herein, the potato slice exit moisture content is defined as the moisture content of the potato slices after exiting the fryer. In one embodiment, at least one of the oil inlet 35 45 55 65 temperatures are adjusted based upon the outlet moisture content of the potato slices as measured by a moisture measuring device 90 situated in proximity of the outlet endless conveyor belt 19. A model FL710, available from Infrared Engineering, of Irwindale, Calif. can be used for a moisture measuring device.

The oil flow, oil temperature, and submerger speed can be varied, either independently or in combination, to control the potato slice exit moisture content. For example, in one embodiment, the moisture control strategy comprises a cascaded process control approach to control the outlet oil temperature of the main heat exchanger 78. The moisture control algorithm comprises three cascaded control loops. Utilizing a cascaded approach allows each control loop to be optimally tuned to match the process control constraints, thus netting the best possible overall control performance. The outer most loop is the moisture control loop. The intermediate control loop is a temperature controller with the setpoint being generated by the output of the outer control loop and utilizing the temperature at the outlet of the main heat exchanger 78 as the process control variable. The inner most control loop controls a steam flow control valve at the main heat exchanger 78 based on a setpoint generated by the output of the intermediate control loop and utilizes steam pressure (which heats the oil in the main heat exchanger) as the process variable. Although steam is the preferred heating medium other sources such as gas, thermal fluid, etc. can be used. This controlled cascade utilizes a recipe-driven product moisture setpoint and leverages the moisture meter as the process control variable. Due to the long deadtimes associated with the process, a model predictive advance control software package was used in lieu of a traditional PID loop. Model predictive advance control software can be purchased from Fisher-Rosemount of Austin, Tex. or Honeywell Industrial Automation & Control, of Phoenix, Ariz. Traditional control loops, in this situation, would typically need to be detuned to compensate for process lag, thus sacrificing process control performance. The advanced control software permits more aggressive and optimal process control. For example, the oil outlet temperature from the main heat exchanger 78 is continuously adjusted to keep the moisture content of the potato slices exiting the fryer between about 0.8% and about 2% by weight. If the moisture content set point is 1.4% and the moisture content increases above about 1.4% by weight, then a signal is transmitted to the temperature controller at the main heat exchanger 78 (intermediate loop), which will in turn transmit a signal to the control valve regulating steam pressure into the main heat exchanger 78 (inner loop), which will in turn control the flow of steam into the main heat exchanger 78. Moisture control with this invention can be achieved through regulation of the main heat exchanger hot oil temperature without affecting the temperatures of the oil entering the flume (flume oil temperature) or the cooled oil entering the low temperature zone (cooling oil temperature). Although this example shows how moisture control over the last 3 zones of the fryer can be controlled independently by varying oil temperature alone (keeping oil flow and submerger speed constant), it should be noted that those skilled in the art, given the above explanation, will be able to control chip moisture independently or in combination with oil temperature, oil flow, and submerger speed as well.

In one embodiment, the temperature at the flume 3 can be adjusted accordingly by increasing or decreasing the percentage of flow of cooling oil, from, for example, from a by-pass line that by-passes the heat exchanger 78 with the heated oil exiting the heat exchanger 78. Thus, hot oil temperature can be manipulated without substantially changing the flow rates in the last 3 inlets 45 55 65. Likewise, oil flow can be manipulated without substantially changing the temperature in the last 3 inlets 45 55 65.

As the potato slices proceed downstream through the fryer, rotating finger paddles, drum paddles, paddle wheels, dunkers 13 and/or submerging conveyors 17 can keep the potato slices submerged in the re-heated hot oil as the potato slices are dehydrated to a moisture content of less than about 2% and more preferably less than about 1.5%. The drum paddles 13 or submerging conveyor 17 speed can be varied to increase or decrease the dwell time of the potato slices in the fryer. In one embodiment, the drum paddle 13 and/or submerging conveyor 17 speed is adjusted based upon the outlet moisture content of the potato slices as measured by a moisture measuring device 90 situated above the outlet endless conveyor belt 19. In a preferred embodiment, both the submerging conveyor 17 speed and the last two inlet 55 65 temperatures are automatically varied by smart controls software to achieve an outlet moisture content of about 1.4%.

The total dwell time of the potato slices in the slicer exiting 1 to the endless take out conveyor 19 is about 7 to about 9 minutes. The oil content of the potato chips made by the above-described process is between about 20% to about 23% by weight, which can be lower than a kettle-style chip made in a traditional process. It may be desirable to add additional oil to the chips by using a trough-type device 80 having overflow weirs to produce a thin-film oil curtain. One such device is a HeatWave® weir which can be purchased form Heat and Control of Hayward, Calif. In one embodiment, the thin-film oil curtain covers the width of the take out conveyor 19 to add oil to the potato slices at the exit end of the fryer to achieve an oil content of up to 40% by weight, and more preferably of about 28% to about 32% by weight. Such oil contents are more typical of the oil content in a traditional kettle-style potato chip. In one embodiment, the oil curtain is added prior to measurement of the potato slice moisture content. Using an oil curtain, rather than an oil spray, is more advantageous because use of a curtain lessens the tendency of the oil to oxidize while traveling downward through air toward the potato slice. Processing the potato slices in the above-described manner results in a hard-bite kettle-style potato chip similar to that produced in a traditional batch process.

Prior to this discovery, product load was used to drop the oil temperature and additional hot oil was added to elevate the temperature in the main fryer. Thus, the ratio of product to oil was very important. If too much product was used and the resultant oil temperature was too low, the potato slices would cluster and stick together, resulting in product defects including soft centers because of the difficulty in frying clustered potato slices. If too little product was added the low point temperature was not reached and the hard, desirable texture was not achieved. Prior to this discovery, it was very difficult to quickly get, on a continuous basis, to the proper low point temperature for the requisite residence time. Thus, product quality was sporadic. As a result of this instant invention, hard-bite kettle-style potato chip similar to those traditionally made in a batch process can be made with fewer product defects in a continuous process at much higher production levels.

Surprisingly, one consumer test showed that consumers actually preferred potato chips made by the present invention over traditional prior art batch-cooked kettle-style potato chips. The test was conducted with a group of 127 consumers who indicated they consumed some Kettle-style potato chips at least once a week. The group contained nearly the same number of males and females and approximately the same number of people between the ages of 18 to 25 as between 26 to 35 years old. Whereas the potato chips made from the present invention scored an average of 7.0 on a 9-point hedonic scale for measures of texture and flavor, the prior art chips scored an average of only 6.5 for texture and an average of only 5.9 for flavor. Further, whereas the potato chips made from the present invention scored an average of 7.1 for appearance and overall liking, the prior art potato chips scored an average of only 6.3 for appearance and only 6.1 for overall liking.

Another advantage of this invention is that it provides more efficient operation during start-up. For example, the temperature profile of the fryer can be established without product and when product is placed into the system, a kettle style chip can result with minimal product defects. Hence, very little product is wasted. In a prior art system, on the other hand, because the product itself provides the cooler oil, the system had to run for a period of time with product in order to calibrate the system, resulting in large amounts of initial product defects and unusable product.

It should also be noted that a change in the temperature profile can change the characteristics of the product. In this way, the texture of the product can be controlled to a certain extent. The temperature profile can be easily manipulated by the present invention. Another result of the invention is that it provides the ability to control the major product variables including, but not limited to, texture, moisture and visual characteristics such as curl and clusters. As such, products other than traditional kettle style potato chips could be produced.

An additional advantage of the present invention is that oil quality is enhanced over the oil quality of a prior art batch frying process. For example, in a batch fryer, a relatively large amount of steam is initially produced. Then, once the potato slices have reached their low point temperature, substantially less steam is produced. By the time product is removed from the fryer, there is very little steam being produced. When relatively small amounts of steam are produced, air at the oil surface is able to contact the oil. As a result, oxidation can take place. Oxidation of oil negatively impacts and lowers oil quality. A lower oil quality leads to a shorter shelf life and lowers food product qualities such as flavor and color. As long as product exists in a continuous fryer, on the other hand, a steam blanket exists at the oil surface as a result of product being fried. The steam blanket reduces the amount of air able to contact the oil. When less air contacts the oil, less oxidation takes place. Less oxidation equates to a higher oil quality, which equates to higher food product quality. In either a batch or a continuous process, if oil quality reaches a certain threshold, at least a portion of the oil should be replaced with fresh oil. Thus, to maintain the same oil quality in a batch process that is inherently available in a continuous process, requires more fresh oil to be added more often.

EXAMPLE

The following is a specific example of one embodiment of the invention. Approximately 4000 pounds per hour of unwashed peeled potatoes (corresponding to approximately 1100 pounds per hour of finished product) were sliced to a thickness of about 0.062 inches onto a high speed belt 21 and then placed in a flume 3. Hot oil at 316° F. (158° C.) was pumped into the flume 3 at about 193 gallons per minute (730 liters per minute). The potato slices had a residence time of approximately 15 to 20 seconds in the flume 3. The potato slices were then fed into the upstream portion of the fryer 40. Hot oil at a temperature of about 262° F. (128° C.) from a mid-section portion of the fryer was pumped at 85 gallons per minute (320 liters per minute) from a first outlet 44 through the hot oil cooler 48, resulting in an oil temperature ranging from about 230° F. (110° C.) to about 248° F. (120° C.) in the upstream portion of the fryer 40. The potato slices were kept in this temperature range for a residence time of approximately three minutes. In this particular example, no hot oil entered the third inlet 35. Hot oil at a temperature of about 356° F. (180° C.) was added to the fourth inlet 45 at a rate of about 70 gallons per minute (260 liters per minute) raising the oil temperature just down stream of the fourth inlet 45 to 275° F. (135° C.). Hot oil was withdrawn from the fryer at the second outlet 54 at a temperature of about 273° F. (134° C.) at a rate of about 62 gallons per minute (235 liters per minute). Downstream of the second outlet 54 hot oil at a temperature of about 356° F. (180° C.) was added to the fifth inlet 55 at a rate of about 70 gallons per minute (260 liters per minute) raising the oil temperature to 295° F. (146° C.) just downstream of the fifth inlet 55. Hot oil was withdrawn from the fryer at the third outlet 64 at a temperature of about 293° F. (145° C.) at a rate of about 57 gallons per minute (216 liters per minute). Downstream of the third outlet 64 hot oil at a temperature of about 356° F. (180° C.) was added to the sixth inlet 65 at a rate of about 70 gallons per minute (260 liters per minute) raising the oil temperature to 303° F. (151° C.) just downstream of the sixth inlet 65. Hot oil was withdrawn from the fryer at the fourth outlet 74 at a temperature of about 298° F. (148° C.) at a rate of about 280 gallons per minute (1062 liters per minute). The resultant potato chip had a moisture content of about 1.4 percent by weight and an oil content of about 20% to 22% by weight.

While the invention has been particularly shown and described with reference to a preferred embodiment, it will be understood by those skilled in the art that various changes in form and detail may be made therein without departing from the spirit and scope of the invention.

What is claimed is:

1. A method for continuously making potato chips in a flume and a fryer comprising the steps of:
    a) frying a plurality of potato slices in an oil in said flume at an initial oil temperature of between about 300° F. and about 320° F. wherein said potato slices and said oil exit said flume to an upstream section of said fryer;
    b) injecting cooling oil from a hot oil cooler into said upstream section of said fryer, said injected cooling oil having a cooling oil temperature below that of an oil residing in said upstream section, wherein said potato slices exit said upstream section to a remaining section of said fryer; and
    c) injecting heating oil into said remaining section of said fryer downstream of said upstream section, said injected heating oil having a heating oil temperature above that of an oil residing in said remaining section.

2. The method in claim 1 wherein said cooling oil at step b) is at a temperature of less than about 250° F.

3. The method in claim 1 wherein said oil residing in said upstream section at step b) is at a temperature of between about 230° F. and about 260° F.

4. The method in claim 1 wherein said cooling oil at step b) comprises fresh oil at ambient temperature.

5. The method in claim 1 wherein said heating oil temperature at step c) is more than about 320° F.

6. The method in claim 1 wherein said heating oil temperature at step c) is varied based upon a potato slice exit moisture content.

7. The method in claim 1 wherein an amount of said heating oil injected at step c) is varied based upon a potato slice exit moisture content.

8. The method in claim 1 wherein a potato slice exit moisture content is controlled by said heating oil temperature provided by a main heat exchanger without affecting a flume oil temperature or said cooling oil temperature.

9. The method in claim 1 wherein said potato slices reside in said fryer for a dwell time and wherein said dwell time is varied by changing a submerging conveyor speed based upon a potato slice exit moisture content.

10. The method in claim 1 wherein said potato slices after step c) comprise a moisture content of less than about 1.5% by weight.

11. The method in claim 1 wherein said potato slices after step c) comprise an oil content of between about 20% and about 23% by weight.

12. The method in claim 1 wherein said potato slices after step c) exit said fryer and wherein said potato slices pass through a thin film oil curtain and thereafter comprise an oil content of between about 28% and about 40% by weight.

13. The method in claim 1 wherein said injecting at step c) occurs at an oil inlet and wherein oil in said remaining section of said fryer exits said remaining section of said fryer upstream of said oil inlet.

14. A method for continuously making kettle-style potato chips comprising the steps of:
    a) frying a plurality of potato slices in an oil in said flume at an initial oil temperature of between about 300° F. and about 320° F. wherein said potato slices and said oil exit said flume to an upstream section of said fryer;
    b) frying said potato slices in said upstream section of said fryer, wherein a cooling oil is injected into said upstream section of said fryer, said cooling oil having a cooling oil temperature of less than about 250° F.; and
    c) frying said potato slices in a remaining section downstream of said upstream section, wherein a heating oil is injected into said remaining section, said heating oil having a heating oil temperature above about 300° F.

15. The method in claim 14 wherein said upstream section of said fryer at step b) comprises a low point temperature range of between about 230° F. and about 260° F.

16. The method in claim 15 wherein said potato slices are fried in oil at said low point temperature range for about 3 minutes to about 4 minutes.

17. The method in claim 14 wherein said cooling oil at step b) comprises oil from a hot oil cooler.

18. The method in claim 14 wherein said cooling oil at step b) comprises fresh oil at ambient temperature.

19. The method in claim 14 wherein said heating oil temperature at step c) is more than about 320° F.

20. The method in claim 14 wherein said heating oil temperature at step c) is varied based upon a potato slice exit moisture content.

21. The method in claim 1 wherein a potato slice exit moisture content is controlled by said heating oil temperature provided by a main heat exchanger without affecting a flume oil temperature or said cooling oil temperature.

22. The method in claim 14 wherein said an amount of said heating oil injected at step c) is based upon a potato slice exit moisture content.

23. The method in claim 14 wherein said potato slices reside in said fryer for a dwell time and wherein said dwell time is varied by changing a submerging conveyor speed based upon a potato slice exit moisture content.

24. The method in claim 14 wherein said potato slices after step c) comprise a moisture content of less than about 1.5% by weight.

25. The method in claim 14 wherein said potato slices after step c) comprise an oil content of between about 20% and about 23% by weight.

26. The method in claim 14 wherein said potato slices after step c) exit said fryer and wherein said potato slices pass through a thin film oil curtain and thereafter comprise an oil content of between about 28% and about 40% by weight.

27. The method in claim 14 wherein said injecting at step c) occurs at an oil inlet and wherein oil in said remaining section of said fryer exits said remaining section of said fryer upstream of said oil inlet.

* * * * *

UNITED STATES PATENT AND TRADEMARK OFFICE
CERTIFICATE OF CORRECTION

PATENT NO. : 7,303,777 B2 Page 1 of 1
APPLICATION NO. : 10/895163
DATED : December 4, 2007
INVENTOR(S) : Ian Andries Baas et al.

It is certified that error appears in the above-identified patent and that said Letters Patent is hereby corrected as shown below:

The amendments to the claims made by Applicant on January 9, 2007, were erroneously omitted by the USPTO, as follows:

Column 10, Line 9, Claim 5, delete [320° F] and add -- 350° F --

Column 10, Line 29, Claim 11, delete [23%] and add -- 22% --

Column 10, Line 64, Claim 19, delete [320° F] and add -- 350° F --

Column 12, Line 3, Claim 25, delete [23%] and add -- 22% --

Signed and Sealed this

Eighth Day of April, 2008

JON W. DUDAS
*Director of the United States Patent and Trademark Office*